Sept. 8, 1936.    H. E. GRAU ET AL    2,053,284
ELEVATOR FOR EXTERNAL UPSET PIPE
Filed Sept. 23, 1935    2 Sheets-Sheet 1
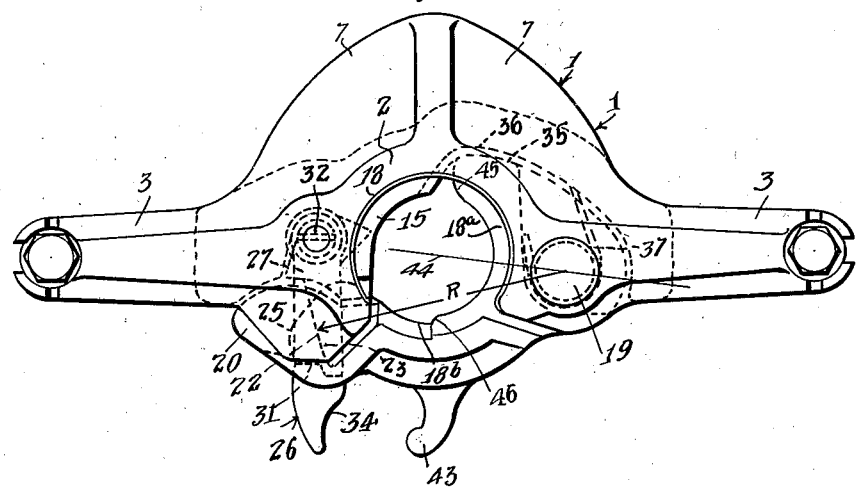
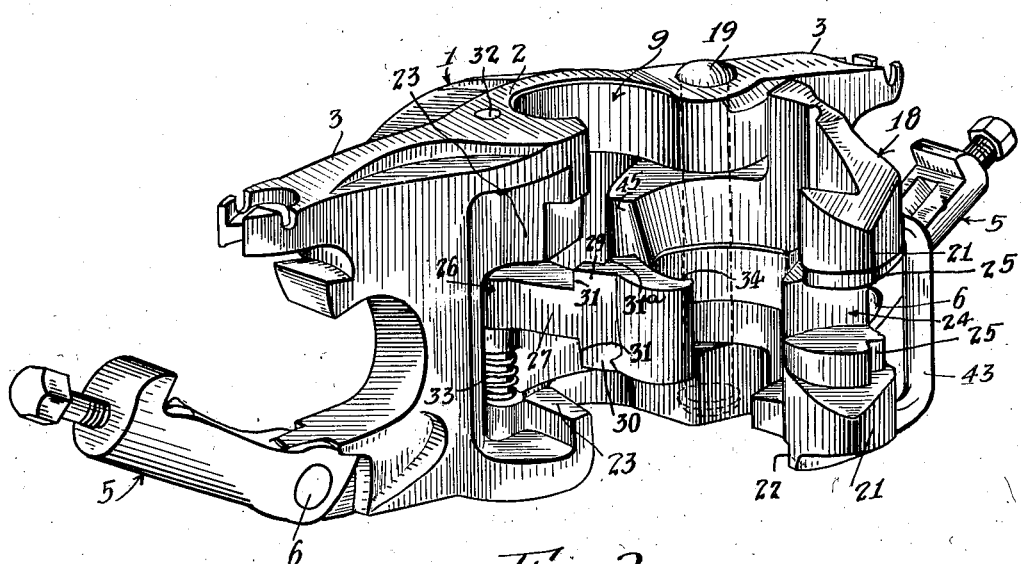
INVENTORS
Herbert E. Grau
Chester A. Lundeen
BY
Lyon+Lyon
ATTORNEYS Sept. 8, 1936.   H. E. GRAU ET AL   2,053,284
ELEVATOR FOR EXTERNAL UPSET PIPE
Filed Sept. 23, 1935   2 Sheets-Sheet 2

Inventors
Herbert E. Grau
Chester A. Lundeen
By Lyon & Lyon
Attorneys

Patented Sept. 8, 1936

2,053,284

UNITED STATES PATENT OFFICE 2,053,284

ELEVATOR FOR EXTERNAL UPSET PIPE

Herbert E. Grau and Chester A. Lundeen, Vernon, Calif., assignors to Byron Jackson Co., Los Angeles, Calif., a corporation of Delaware Application September 23, 1935, Serial No. 41,745

14 Claims. (Cl. 24—248)

This invention relates to elevators for raising and lowering pipe in deep wells, such as oil wells. More particularly the invention relates to elevators for use with so-called "external upset" pipe.

The pipe ordinarily used in oil wells consists of sections of pipe joined together with couplings, collars or tool joints that have a larger outside diameter than the pipe, so as to present a flat shoulder on the end of the coupling, or joint. And the elevators commonly used with such pipe have a pair of hinged members adapted to encircle the pipe so that the shoulder presented by the lower end face of the coupling or tool joint, rests upon the upper face of the elevator, thus permitting the pipe to be lifted by the elevator. Such elevators are generally designated as "collar type" elevators.

When the pipe or tubing does not have couplings or joints with flat end faces, as, for instance, when the joints are flush or have a gradually tapering external upset, collar type elevators of the usual type can not be used because there is no flat shoulder on the pipe or coupling to engage the flat upper face of the elevator. Flush joint pipe or external upset pipe is, therefore, usually handled either (1) with end plugs and a collar elevator, or (2) by employing a slip type elevator with tapered slips to clamp the pipe. Both of these methods of handling pipe (especially drill pipe) are objectionable. The plug method is cumbersome and expensive because a plug to present a supporting shoulder, must be screwed into the upper end of each stand of pipe as it is pulled from the well, and then removed when the pipe is run back into the well. The use of slip type elevators is objectionable because such elevators are, of necessity, quite large and heavy and hard to handle.

An object of the present invention is to provide an elevator of simple construction capable of handling external upset pipe, and which is similar in its general operation to a collar type elevator.

Another object is to provide an elevator which has a tapered seat adapted to conform to the taper on the pipe, to support the same, and so constructed as to facilitate the handling of the pipe into or out of the elevator.

Another object is to provide an elevator for use with external upset pipe, so constructed as to relieve the gate or door of radial outward strains but so that the door can take a part of the stresses in a horizontal plane that are developed by the spreading action or wedging action at the taper of the pipe by reason of the great weight of the pipe string hanging in the elevator.

Another object is to provide an elevator with means for holding the door open when the elevator is going up the derrick, and means on the door for automatically closing the door upon contact with the pipe that is being placed in the elevator.

Another object is to provide an elevator having means for preventing the removal of the pipe or tubing when the elevator is under load, that is to say, when tubing is hanging in the elevator.

Another object is to provide an elevator with means to prevent the opening of the door when the elevator is under load; also to provide a construction whereby the load on the elevator tends to hold the door closed.

Another object is to provide an elevator for use with external upset pipe in which the pipe-receiving throat is flared outwardly below the "upset" seat so as to facilitate placing the elevator around the pipe.

Further objects of the invention will appear hereinafter.

The invention consists in the novel parts and combination of parts to be described hereinafter, all of which contribute to produce an efficient elevator for external upset pipe.

A preferred embodiment of the invention is described in the following specification, while the broad scope of the invention is pointed out in the appended claims.

In the drawings:

Figure 1 is a top plan view of the elevator with its gate or door in its closed position.

Figure 2 is a perspective of the elevator illustrated in Fig. 1, but with the door or gate in its open position.

Figure 4:
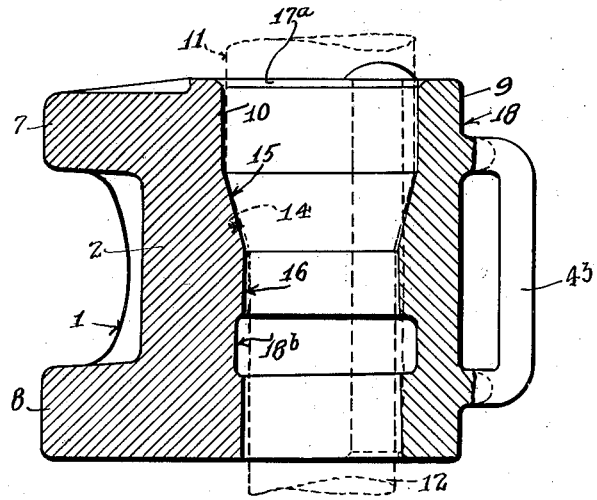
Fig. 4 is a vertical section taken about on the line 4—4 of Fig. 3, and indicating an upset pipe supported in the elevator, in dotted lines.

Before proceeding to a more detailed description of the invention, it should be stated that the body of the elevator is constructed with a vertical opening or bore, which is open on its forward side to form a receiving throat enabling the elevator to be applied by lateral movement to the pipe. This opening is formed with an upper, straight-walled cylindrical portion extending slightly more than 180° around the axis of the upset portion of the pipe, and with a tapered seat at the lower end of the cylindrical portion adapted to be engaged by the tapered portion of the upset pipe. The width of the receiving throat is slightly more than the diameter of the body of the pipe that is to be supported in the elevator, but somewhat less than the diameter of the upset portion of the pipe.

Consequently, when upset pipe is hanging in the elevator, the overhanging walls of the upper, cylindrical portion of the bore located at the front of the elevator, would prevent the pipe from moving out of the throat. However, in order to apply the elevator to the pipe, it is merely necessary to move it laterally onto the pipe below the upset of the pipe, and then raise the elevator or move it along the pipe until it engages the upset. Of course, elevators of this kind are subjected to enormous loads when a pipe string is hanging in the elevator, and by reason of the fact that the pipe is supported on a tapered seat, the upset of the pipe exerts a considerably horizontal strain in a diametrical direction across the throat, tending to spread the throat.

In the present improvement, the load is carried on two surfaces, one being in the body at one side of the pipe receiving opening and preferably extending thru about 120 deg. The other seat is on the door and closing tongue, extending thru about 180 degrees located substantially diametrically opposite the seat in the body, and so placed that the direction of the thrust is somewhat inwardly against the hinge pin and not outwardly against the door. Thus the strain extends laterally thru the body, which is reinforced by the door with the hook-lugs on the swinging end engaging the body.

Our invention also includes means to be attached across the throat of the elevator, operating to tie the sides of the elevator together at the front, and constructed in such a way as to take up the stresses due to the spreading action referred to above, and thereby relieve the elevator body of considerable strain. This enables the elevator body to be constructed with vertical cross sections of reduced dimensions, and has a general advantage of enabling a lighter elevator to support a given load. Although it is not essential in the operation of our elevator, we find that it is sometimes desirable to provide means for holding the door or gate in the open position as the elevator goes up the derrick. To accomplish this result we provide a coil spring around the door hinge pin, and pressing against the door and body. The door is preferably provided with means in the path of the pipe as it passes laterally through the throat of the elevator, which operates to swing the door or gate to its closed position. The elevator is preferably provided with means for automatically latching the door or gate in its closed position. The door or gate is preferably mounted on a hinge pin of considerable diameter, and this hinge pin is, of course, subjected to a considerable shearing stress when the elevator is supporting a heavy load.

Referring more particularly to the parts, and especially to Figs. 1 and 2, 1 indicates the elevator body, the inner portion of which is in the form of an incomplete ring or hub 2, from which two lugs or arms 3 project outwardly at diametrically opposite points, said arms enabling the elevator to be supported on the elevator links (not illustrated). If desired, the arms 3 may be provided with latches 5 pivoted at 6 for preventing accidental displacement of the elevator from the links.

Near the upper and lower ends of the hub 2, the elevator body is provided with flanges 7 and 8 of substantial thickness, which are integral with the hub, and these flanges give the elevator considerable strength as a "strong back" for resisting substantially radial forces tending to spread the throat of the elevator under heavy load. The vertical cross section resulting from this form, is illustrated most clearly in Fig. 4. The thickness of the elements of this hub must be considerable to enable it to take up the strains.

The hub 2 is provided with an opening or incomplete bore 9, the upper portion 10 of which (see Fig. 4), is preferably substantially cylindrical and of slightly larger diameter than the diameter of the upset 11 of the pipe 12, as indicated in Fig. 4. At the point where the upset 11 of the pipe joins the body of the pipe, the pipe presents a tapered or substantially conical face 14. This tapered portion is received on a tapered or substantially conical seat 15 formed in the bore or opening 9, and below this tapering seat the bore may be substantially cylindrical, but is preferably formed so that it flares outwardly. In other words, below the seat 15 the bore has a slightly conical neck 16 that enlarges slightly in a downward direction. On its forward side the elevator body is cut away to form a receiving throat 17, the width of which is substantially the same as the diameter of the bore at the slightly conical neck 16. At the upper end of the bore 9 a slightly conical counterbore 17a is preferably provided.

The elevator is preferably provided with a gate or door 18, which is preferably but not necessarily, provided with resilient means for maintaining the same in an open position. For this purpose the door or gate 18 is preferably slightly curved to conform to the curvature of the pipe, and is attached to the elevator body at one side of the throat 17 by means of a hinge pin 19, which is preferably disposed somewhat forward of the longitudinal axes of the arms 3. The free end 20 of this door or gate, is provided with one or more faces disposed in a more or less vertical plane adapted to engage corresponding faces on the other side of the throat 17 when the gate is in its closed position, and this enables spreading strains developed in the material at the sides of the throat to be imparted to the gate or door, thereby relieving the elevator body of a considerable amount of stress. In order to accomplish this I prefer to provide the upper and lower edges of the door with noses 21 (see Fig. 2), which noses present substantially vertical shoulders 22, which are adapted to engage with corresponding shoulders 23 formed on the adjacent portion of the elevator body. These shoulders or engaging faces 22 and 23 are preferably struck on a radius R having its center at the axis of the hinge pin 19 (see Fig. 1).

Figure 3:
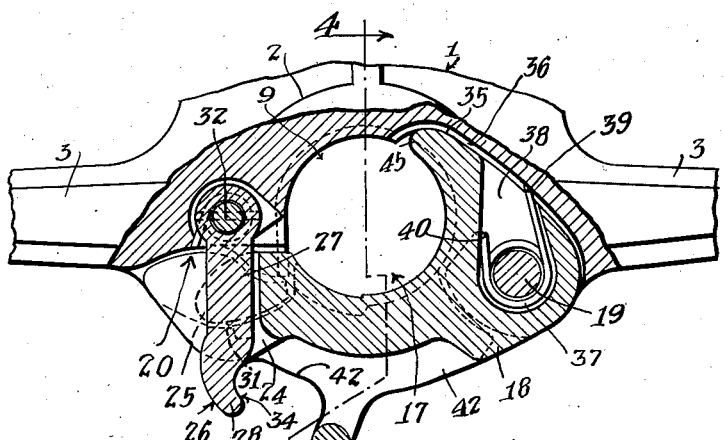
Fig. 3 is a horizontal section taken about on the line 3—3 of Fig. 2, with certain parts broken away, and particularly illustrating the manner in which the door latch operates to hold the door or gate in its closed position.

Referring to Fig. 3, the free edge 20 of the gate or door is preferably provided with a slot 24 in a horizontal plane, at each side of which the door is provided with a rounded abutment or nose 25, and in the latched position of the door, the latch 26 engages over these rounded noses or abutments 25 to hold the same closed. The latch 26 has a shank 27 preferably of rectangular cross section, and at the outer end of this shank the latch has a T head 28, that is to say, it has extensions 29 and 30 that project up and down respectively, so as to engage over the rounded noses or abutments 25. In other words, the latch head 28 presents engaging shoulders 31 (see Fig. 3) that engage over the rounded noses 25, and the engaging faces of the noses 25 and the shoulders 31 are preferably struck on a radius from the axis of the latch hinge pin 32 as the center. While not essential, we prefer to provide a double-step latch, and to this end the nose of the latch is formed with a shoulder 31a outwardly beyond the shoulder 31. The shoulder 31a engages the abutments 25 on the body when the door is in a slightly open position.

The latch pin 32 is mounted in a vertical position in the body of the elevator, preferably about in line with the longitudinal axes of the arms 3, and adjacent the lower end of the pin a recess is formed in the body to receive a coil spring 33 (see Fig. 2). One end of this spring is attached to the hinge pin and the other end engages with the side of the recess so that the spring 33 exerts its force in a direction to urge the latch into engaging position with the door or gate 18. The inner face 34 of the latch head 28 (see Fig. 1) is preferably inclined about as indicated, so that when the same is engaged by the rounded noses 25 on the gate, the latch will be swung to the left as viewed in Fig. 1, until the noses 25 get past the shoulders or latching faces 31, 31a of the T head, whereupon the latch will snap into position and hold the gate or door in its closed position.

The gate 18 presents a concave inner face and is preferably provided with means for closing the gate automatically when the elevator is applied to the pipe. For this purpose, beyond the hinge pin 19 the gate extends circumferentially to form a closing tongue 35 (see Figs. 2 and 3) and in the open position of the gate this tongue projects out across the throat 17 so as to obstruct the throat slightly, that is to say, this tongue would lie in the path of the pipe being moved relatively laterally into the bore 9. In the closed position of the gate, this tongue 35 is received in a recess 36, which is cut back into the side face of the hub 2.

The profile of the inner face of the gate when viewed in vertical section is the same as that of the bore 9 of the elevator body, so that it presents a slightly conical or tapered face opposite to the conical seat 15 of the bore 9. This conical seat 18a preferably extends through an angle of about 120 degrees to a point near the front where it is cut back, that is, outwardly radially, to present a recess or relief face 18b that does not engage the side of the tubing.

When the elevator is to be applied to a pipe or tubing, the gate 18 is opened by the operator, and if the spring 37 is used, the gate is held in an open position by the spring, and while this spring may be of any desired form, it is illustrated as a coil spring 37 which encircles the middle portion of the pin 19; this spring lies in a spring chamber 38 and one end 39 of this spring thrusts against the face of the recess 36 while the other end 40 of the spring thrusts against the door or gate 18 in a direction to open the gate.

On its outer side the gate or door is preferably reinforced by heavy integral ribs 42, which are preferably located about in line with the noses 21, and these ribs may be connected by an integral handhold 43 to enable the gate to be opened or closed by hand when desired.

In the operation of the elevator, the gate 18 stays open of its own accord, or is held open by its spring 37 (if a spring is used) when the elevator is to be applied to the upset pipe. When the pipe is entering the throat 17 to pass into the bore 9, it engages the tongue 35 and this swings the gate or door 18 closed as the pipe becomes centered in the bore 9. When the gate arrives at its closed position it snaps the latch 26 over the rounded noses 25 on the gate, and this holds the gate in its closed position. If the door is not fully latched around the pipe but is caught on the first step 31a of the latch, the door will be forced to the fully latched position when the upset taper on the pipe comes in contact with the tapered seat 18a on the closing finger as the elevator is raised against the pipe upset.

As the gate closes, the shoulders 22 on the noses 21, engage the corresponding shoulders 23 on the adjacent portion of the elevator body 20 (see Fig. 2). In other words, these shoulders seat together and are in contact so that if sufficient strain is developed in the elevator body, tending to spread the throat 17, then tension will be developed in the gate or door, relieving this strain. In this way the door or gate operates as a tension member across the throat.

In applying the elevator to the pipe, of course, it is applied just below the upset of the pipe, and after the pipe is centered, then by pulling up on the elevator, the upset of the pipe will rest upon the tapered seat in the elevator.

When the pipe is hung in the elevator it will be evident that the direction of thrust in the seat face 18a will be in a radial plane from the central axis of the elevator toward the pin 19, that is to say in the general direction of the line 44 in Figure 1.

The distance from this line 44 to the point 45 of the conical seat 18a should be slightly greater than the distance from this line to the point 46 toward the front where the face 18a terminates. This will bring the plane of this radial thrust slightly to one side of the axis of the pin 19 and toward the point 45. This thrust therefore tends to hold the gate closed and makes it impossible for the weight of the tubing to open the gate. This is a great advantage in the direction of safety.

It is understood that the embodiment of the invention described herein is only one of the many embodiments this invention may take, and we do not wish to be limited in the practice of the invention, nor in the claims, to the particular embodiment set forth.

What we claim is:

1. An elevator for use with external tapered upset pipe comprising a body with a pipe-receiving bore therein, having a receiving throat for the pipe, the upper portion of said bore being substantially cylindrical to receive the upper portion of the upset of the pipe and encircling the same more than 180°, said bore having a downwardly tapering seat below the substantially cylindrical upper portion to receive and support the upset of the pipe, and a door pivotally mounted on the outside of the body to swing in a substantially horizontal plane across the receiving throat, said door and said body having engaging shoulders enabling the door to be in tension due to the weight of the supported pipe.

2. An elevator for use with external upset pipe comprising a body with a receiving throat for the bore therein, having a receiving throat for the pipe, the upper portion of said bore being substantially cylindrical to receive the upper portion of the upset of the pipe and encircling the same more than 180°, said bore having a downwardly tapering seat below the substantially cylindrical upper portion to receive and support the upset of the pipe, a door pivotally mounted to swing in a substantially horizontal plane for closing the said throat, said door engaging the tapered portion of the pipe, and means cooperating with the free end of the door so that the door when closed is subjected to tension by the weight of the pipe.

3. An elevator for use with external upset pipe comprising a body with a pipe-receiving bore therein, the upper portion of said bore being substantially cylindrical to receive the upper portion of the upset of the pipe and encircling the same more than 180°, said bore having a downwardly tapering seat below the substantially cylindrical upper portion to receive and support the upset of the pipe, said bore having an outward and downward flare below said tapered seat.

4. An elevator for use with external upset pipe comprising a body having a vertical pipe-receiving bore formed therein, said bore open on its forward side to form a receiving throat enabling the elevator to be moved laterally onto the pipe at a point below the upset thereon, said bore having a downwardly tapered seat for engaging the upset of the pipe to support the same, and a movable tension member supported on the body and extending across the said throat when the pipe is hanging in the elevator.

5. An elevator for use with external upset pipe comprising a body having a vertical pipe-receiving bore formed therein, said bore open on its forward side to form a receiving throat enabling the elevator to be moved laterally onto the pipe at a point below the upset thereon, said bore having a downwardly tapered seat for engaging the upset of the pipe to support the same, a movable door supported on the body, extending across the said throat when the pipe is hanging in the elevator, said body and said door having engaging faces cooperating to impart tension to the door when the weight of the pipe is on the said tapered seat, thereby relieving the strain on the said body.

6. An elevator for use with external upset pipe comprising a body having a vertical pipe-receiving bore formed therein, said bore open on its forward side to form a receiving throat enabling the elevator to be moved laterally onto the pipe at a point below the upset thereon, said bore having a downwardly tapered seat for engaging the upset of the pipe to support the same, a door hinged to said body at one side of said throat, means for normally holding the door open to enable the elevator to be passed laterally onto the pipe, and a latch associated with the outer edge of the said door for latching the door in its closed position.

7. An elevator for use with external upset pipe comprising a body having a vertical pipe-receiving bore formed therein, said bore open on its forward side to form a receiving throat enabling the elevator to be moved laterally onto the pipe at a point below the upset thereon, said bore having a downwardly tapered seat for engaging the upset of the pipe to support the same, a door hinged to said body at one side of said throat, means for normally holding the door open to enable the elevator to be passed laterally onto the pipe, a latch associated with the free edge of the said door for latching the door in its closed position, said door having a tongue projecting into said receiving throat and adapted to be engaged by the pipe when the elevator is applied to the same by a lateral movement, said tongue operating when struck by the pipe, to swing the door closed, and a spring associated with the latch for urging the same into a position to engage the door and maintain the same closed.

8. An elevator for use with external upset pipe comprising a body having a vertical pipe-receiving bore formed therein, said bore open on its forward side to form a receiving throat enabling the elevator to be moved laterally onto the pipe at a point below the upset thereon, said bore having a downwardly tapered seat for engaging the upset of the pipe to support the same, a door with a hinge pin connecting the same to the body at one side, said door having a tapered circumferentially extending seat for the upset of the pipe, and being adapted to swing across the throat to close the same, the upper end of said door and the adjacent portion of said body having engaging faces for imparting tension to the door to relieve strains in the said body, the circumferential dimension of said tongue measured from the radial line passing through the hinge pin being greater than the circumferential distance from the said radial line to the forward end of the tapered seat of the door, so that the weight of the pipe exerts a thrust on the door in a direction to maintain the door closed.

9. An elevator for use with external upset pipe comprising a body having a vertical pipe-receiving bore formed therein, said bore open on its forward side to form a receiving throat enabling the elevator to be moved laterally onto the pipe at a point below the upset thereon, said bore having a downwardly tapered seat for engaging the upset of the pipe to support the same, a door with a hinge pin connecting the same to the body at one side, said door having a tapered circumferentially extending seat for the upset of the pipe, and being adapted to swing across the throat to close the same, the circumferential dimension of said tongue measured from the radial line passing through the hinge pin being greater than the circumferential distance from the said radial line to the forward end of the tapered seat of the door, so that the weight of the pipe exerts a thrust on the door in a direction to maintain the door closed.

10. An elevator for use with external upset pipe comprising a body having a vertical pipe-receiving bore formed therein, said bore open on its forward side to form a receiving throat enabling the elevator to be moved laterally onto the pipe at a point below the upset thereon, said bore having a downwardly tapered seat for engaging the tapered portion of the upset of the pipe to support the same, a door hinged to said body at one side of said throat to swing in a substantially horizontal plane, and means including a pivoted latch associated with the outer edge of the said door for latching the door in its closed position and operating to hold the door closed against lateral thrust of the pipe.

11. An elevator for use with external upset pipe comprising a body having a vertical pipe-receiving bore formed therein, said bore open on its forward side to form a receiving throat enabling the elevator to be moved laterally onto the pipe at a point below the upset thereon, said bore having a downwardly tapered seat for engaging the upset of the pipe to support the same, a door hinged to the outer side of said body at one side of said throat, said door having a closing tongue in the path of the pipe when the same passes into the open elevator, for closing the door, and a latch associated with the outer edge of the door for latching the door in its closed position.

12. An elevator constructed as described in claim 11, in which the closing tongue is tapered to engage the tapered upset on the pipe and thereby move the door to its fully closed position as the pipe comes onto the tapered seat.

13. An elevator for use with external upset pipe comprising a body having a vertical pipe-receiving bore formed therein, said bore open on its forward side to form a receiving throat enabling the elevator to be moved laterally onto the pipe at a point below the upset thereon, said bore having a downwardly tapered seat for engaging the upset of the pipe to support the same, through about 120°, a door with a hinge-pin connecting the same to the body at one side, said door having a tapered seat for engaging the upset of the pipe through an angle of about 180°, said hinge-pin being placed so that the line of thrust developed by the load on the elevator is substantially radially toward the hinge-pin.

14. An elevator for use with external upset pipe comprising a body having a vertical pipe-receiving bore formed therein, said bore open on its forward side to form a receiving throat enabling the elevator to be moved laterally onto the pipe at a point below the upset thereon, said bore having a downwardly tapered seat for engaging the upset of the pipe to support the same, a door with a hinge-pin connecting the same to the body at one side, said door having a tongue with a tapered circumferentially extending seat for the upset of the pipe, a latch for holding the elevator door closed, said latch being double-stepped with two latching shoulders so that one of the latching shoulders will hold the door partially closed, the tapered seat on the tongue operating to effect the complete closing of the door when the weight of pipe comes onto the tongue.

HERBERT E. GRAU.
CHESTER A. LUNDEEN.

DISCLAIMER 2,053,284.—*Herbert E. Grau* and *Chester A. Lundeen*, Vernon, Calif. ELEVATOR FOR EXTERNAL UPSET PIPE. Patent dated September 8, 1936. Disclaimer filed October 20, 1942, by the assignee, *Byron Jackson Co.*

Hereby enters this disclaimer to claims 1, 2, 4, 5, and 10 in said specification.

[*Official Gazette November 24, 1942.*]